June 2, 1953  DE VERNE V. DOTY ET AL  2,640,462
AUTOMATIC POULTRY FEEDER
Filed Feb. 19, 1949
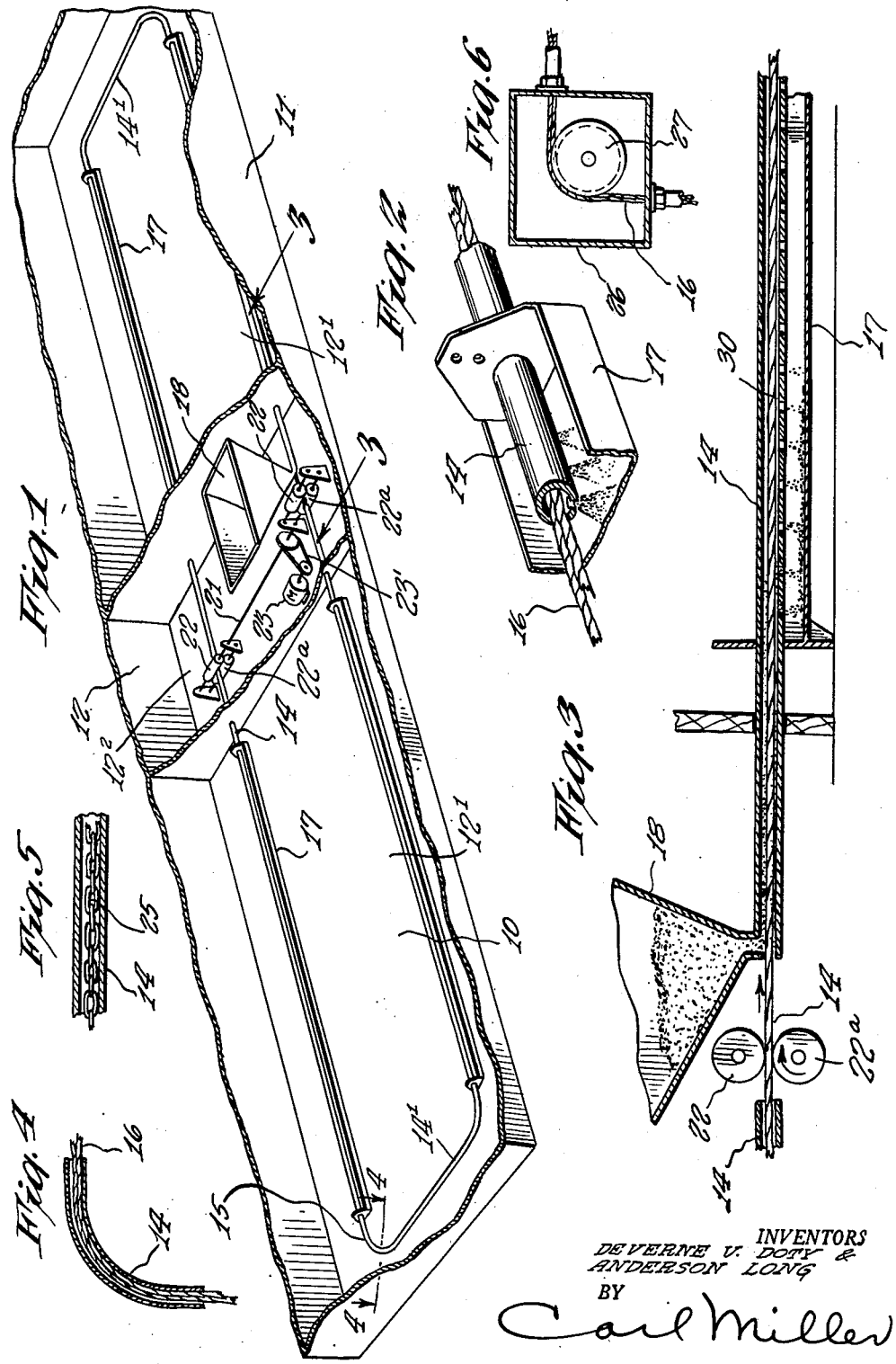
INVENTORS
DEVERNE V. DOTY &
ANDERSON LONG
BY
Carl Miller
ATTORNEY Patented June 2, 1953

2,640,462

UNITED STATES PATENT OFFICE 2,640,462

AUTOMATIC POULTRY FEEDER

De Verne V. Doty, Milton, and Anderson Long, Frankford, Del.

Application February 19, 1949, Serial No. 77,386

4 Claims. (Cl. 119—52)

This invention relates to an automatic poultry feeder.

It is an object of the present invention to provide an automatic poultry feeder wherein mash, grain, pellets and other feed, can be deposited in a hopper at one or more stations within the poultry house and be taken and distributed throughout the length of the house in troughs and wherein the operation is continuous and a continuous rope, cable or chain of simple construction is employed.

Other objects of the present invention are to provide an automatic poultry feeding system which is of simple construction, inexpensive to install, may be formed of standard parts such as ordinary piping, rope, cable or chain, and has little opportunity for loss of feed and efficient in operation.

For other objects and for a better understanding of the invention, reference may be had to the following detailed description taken in connection with the accompanying drawing, in which Fig. 1 is a perspective layout view of the automatic feeding system embodying the features of the present invention and showing the arrangement of the same over the floor of the poultry house.

Fig. 2 is a fragmentary enlarged perspective view of a portion of the pipe and of one end of a trough.

Fig. 3 is a fragmentary longitudinal sectional view taken on line 3—3 of Fig. 1.

Fig. 4 is a fragmentary sectional view of the bent corner of a pipe and utilizing rope for the extension of feed therethrough.

Fig. 5 is a fragment of a pipe utilizing an ordinary link chain for the moving of the feed through the pipe.

Fig. 6 is a fragmentary sectional view of a modified form of corner construction wherein feed may be placed in corner boxes to pass the same to the pipes, and idlers inserted to relieve friction at the corners.

Referring now to the figures, 10 represents the floor of a poultry house 11 having a feed room 12 and run spaces 12' at the opposite sides of the feed room.

Extending from the feed room and into each of the run spaces is a continuous pipe 14 bent at the ends of the space, as indicated at 15, and formed of standard metal, fibre, or aluminum pipe stock. The pipes 14 are of U-shape and their leg ends 14' are aligned with one another so that rope 16 can run continuously through the different pipes, the feed room and from one end of the poultry house to the other. In the pipes which may be about one and a half inches in diameter, there are drilled holes 30, five-eighths or three-quarters of an inch in diameter and two to six inches apart throughout the longitudinally extending legs of the pipe. Under these portions of the pipe which have holes therein, there is disposed a trough 17, Fig. 2, into which the feed is dispensed and from which it is taken by the chickens. The rope 16 will take feed from a hopper 18 and draw it through the pipe for distribution through the openings of the pipe and into the trough. As soon as the trough has become sufficiently filled so that no feed can drop from the openings, said feed will be taken around the bends 15 to the trough at the opposite side of the run space. By that time, the feed taken from the hopper should be well distributed into the first trough and in a little more time, the feed will be distributed in the second trough. The rope 16, when returned to the hopper 18 will again be free of feed and be ready to take feed from the hopper 18, and travel through the same course repeatedly as before.

To operate the rope, there is provided a drive mechanism having rubber rollers 22, 22' engaging with the rope within the feed room at the opposite side 12² thereof for causing the movement of the rope through the pipes. An electric motor 23 is connected to the drive mechanism to operate the same and can be controlled by an electric switch (not shown). A belt transmission 23 drives a shaft 21 on which one of the rubber rollers 22 and 22', respectively, is mounted for common rotation.

With this arrangement, the feed can be delivered to the feed room and the hoppers therein in bulk and brought to the room either from a hopper from which conveyors will lift the feed to hopper 18, or by any other means from which the truck or dump body can be unloaded.

If desired, instead of having a rope 16 for the pulling of the feed through the pipes, an ordinary link chain 25 shown in Fig. 5, may be employed.

Instead of providing bends in the pipe, a corner box construction 26 may be used on the floor and consists of a pulley 27 over which the rope 16 is extended, and a shaft encased in concrete at the bottom. Grain or feed may be placed in this box for distribution, if desired, or the box may receive feed from one pipe and passed through the other. However, the main purpose of the pulley used as an idler, is to relieve friction.

It should now be apparent that with this system, feed where this system is installed in long houses, can be easily distributed throughout the run spaces of the poultry house and into troughs and without the attendant having to enter the run spaces to feed the flock.

While various changes may be made in the detail construction, it shall be understood that such changes shall be within the spirit and scope of the present invention as defined by the appended claims, and furthermore our invention is not limited to the feeding of poultry alone, but may be used to feed other farm animals, as may be desired.

Having thus set forth and disclosed the nature of our invention, what is claimed is:

1. An automatic poultry feeder comprising a pipe having a plurality of longitudinally spaced feed drop holes, a trough disposed beneath the pipe in a horizontal plane to receive the feed, a continuous rope extending through the pipe, power means for friction driving the feed rope continuously through the pipe and a hopper for extending the feed to the pipe, and said pipe having at least one U-shaped portion disposed in a horizontal plane and having closed end portions and leg portions, and said rope being in the form of a loop and continuous and said power means engaging the rope at the opposite leg portions.

2. An automatic poultry feeder comprising two U-shaped pipes having throughout portions of the same respectively feed outlet openings, said pipes being arranged with their leg portion ends aligned and a continuous rope extending through the pipes and adapted to be driven therethrough, power means including a friction drive for driving the rope at the opposite sides thereof and adjacent the leg portion ends, troughs extending along the portions of the U-shaped pipes, said pipes being in horizontal planes and having openings therein to dispense the feed, and hopper means for extending the feed to the pipes.

3. An automatic poultry feeder comprising a horizontally disposed pipe having a plurality of longitudinally spaced feed drop holes, a trough disposed beneath the pipe in a horizontal plane to receive the feed, a continuous rope extending through the pipe, power means including a friction drive for driving the feed rope continuously through the pipe and a hopper for extending the feed to the pipe, and said pipe being of U-shape disposed in a horizontal plane and having end portions and leg portions, and said rope being in the form of a loop and continuous and said power means engaging the rope at the opposite leg portions.

4. An automatic poultry feeder comprising two U-shaped pipes having throughout portions of the same respectively feed outlet openings, said pipes being arranged with their leg portion ends aligned and a continuous rope extending through the pipes and adapted to be driven therethrough, power means including a friction drive engaging with the rope at the opposite sides thereof and adjacent the leg portion ends, troughs extending along the portions of the U-shaped pipes, said pipes being in horizontal planes and having openings therein to dispense the feed, and hopper means for extending the feed to the pipes.

DE VERNE V. DOTY.
ANDERSON LONG.

References Cited in the file of this patent

UNITED STATES PATENTS

| Number | Name | Date |
|---|---|---|
| 691,439 | Campbell | Jan. 21, 1902 |
| 2,043,595 | Raymond | June 9, 1936 |
| 2,081,947 | McCornack | June 1, 1937 |
| 2,563,321 | Dugan | Aug. 7, 1951 |
| 2,589,706 | Kitson et al. | Mar. 18, 1952 |

FOREIGN PATENTS

| Number | Country | Date |
|---|---|---|
| 515,102 | Great Britain | Nov. 27, 1939 |